United States Patent Office 3,289,755
Patented Dec. 6, 1966

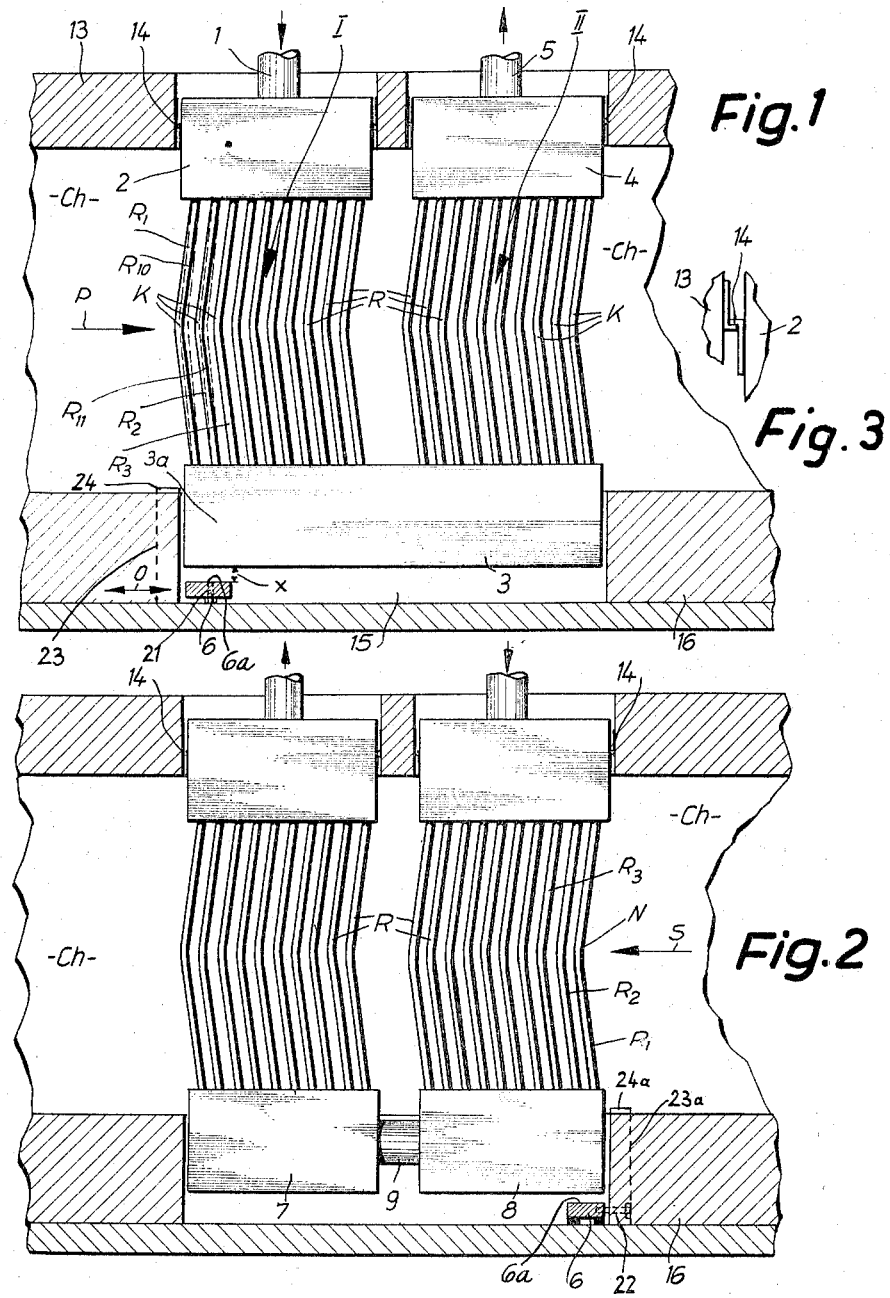

3,289,755
HANGING RECUPERATOR WITH ADJUSTABLE STOP FOR THERMAL EXPANSION
Heinz Jacobs, Geldern, Germany, assignor to Industrie-Companie Kleinwefers Konstrucktions- und Handelsgesellschaft m.b.H., Krefeld, Germany, a corporation of Germany
Filed Jan. 29, 1965, Ser. No. 429,014
Claims priority, application Germany, Feb. 4, 1964, J 25,217
5 Claims. (Cl. 165—145)

This invention relates to a recuperator equipped with hanging or suspended pipes arranged vertically to the direction of flow of fuel gases in a fuel gas channel of the recuperator and bent or curved in that direction or directly opposite thereto. The open ends of the pipes are disposed in upper distributor and collector boxes and in one or several lower transfer or connecting boxes which are set into suitable recesses in the fuel gas channel. The upper distributor box and collector box are set into recesses in the fuel gas channel in such a manner that there remains only a very slight space for sealing purposes between the boxes and the walls of the channel. Since the one or several lower connecting boxes are suspended from the pipes, the pipes are freely expansible and thus eliminate need for means which compensates for thermal expansion of the pipes.

It is a known practice in automobile radiators and heaters to provide heating or cooling pipes in a frame, preferably in a honeycomb pattern on a single plane which is perpendicular to the direction of flow of a second medium, such as air, which is conducted between the pipes. In a further well-known embodiment of a cooler, an upper collector and a lower collector may be provided with lateral pull rods on which are mounted springs which abut against the lower collector. Such rods and frames cannot be used for recuperators since there is not sufficient lateral space in the fuel gas channels next to the collector and distributor boxes and since the frames or rods are themselves subject to thermal expansion.

When the pipes of a recuperator are acted upon by the hot fuel gases, it must be kept in mind that the pipes which are consecutively arranged with respect to the direction of flow of the fuel gases are subject to different amounts of thermal expansion. This occurs since the pipes on the entry side of the flow of the gases therebetween and therethrough are exposed to hotter fuel gases than those pipes which are the last ones with respect to the direction of flow and are exposed to cooler fuel gases. By properly conducting air in the pipes, an attempt is made to compensate to a great extent for this varying thermal load.

Due to the different longitudinal expansion of the consecutively disposed pipes there is a resultant difference in the bend of the pipes and also a tilting of the one or several lower connecting boxes, so that the connection points between the pipes and the boxes are put under great stress. Even the pipes themselves are subjected to a corresponding varying strain. When considering the pipes themselves, it becomes apparent that stresses develop, since particularly in the pipes that are the first with respect to the direction of flow of the fuel gases, that pipe-wall portion which is directly exposed to the gases is subjected to a very different thermal load from that with which that portion of the pipes turned away from the direction of flow is subjected.

This invention reduces, if not overcomes, this difference in the thermal load particularly of those pipes which are bent or curved only in the direction of flow of the fuel gases. Also, the invention prevents tilting or sagging of the one or several lower connecting boxes into which the pipes open. To achieve this, the invention provides a limit stop in a recuperator which has the hanging or suspended pipes. This stop is disposed at the elevation of the first pipes with respect to the direction of flow of the fuel gases and below the one or several connecting boxes for limiting the expansion of these first pipes. Also, the stop is in the fuel gas channel or the recess for the connecting box and serves to support only the forward portion of the pipes and the connecting box. In this manner the pipes are subdivided in the direction of flow of the fuel gases into a suspended or hanging section or group and a partially suspended, partially standing section or group or an exclusively standing section or group. The stop is adjustable in elevation and particularly in the direction of flow of the gases and may extend over the entire width of the connecting box or over a part of same, the width and the angle of the stop also being adjustable in this regard.

Moreover, the bend or curvature of those pipes which are first in line with respect to the direction of flow may be less than that of the following pipes—a measure which boosts the effect of the stop.

The accompanying drawings illustrate two exemplified embodiments of the recuperator in accordance with the invention wherein:

FIGURE 1 shows a recuperator with one lower connecting box and with its pipes bent in a direction opposed to that of the flow of the gases;

FIGURE 2 shows a recuperator divided into two groups of pipes and having two connecting boxes, with its pipes bent in the direction of flow of the fuel gases; and FIGURE 3 is a fragmentary section view showing support of an upper distribution box in the fuel gas channel of the recuperator of FIGURE 1.

In the embodiment of FIGURE 1, the fuel gas in a fuel gas channel Ch (partially shown) flows in the direction of an arrow P and in so doing acts upon the pipes R of pipe groups I and II with the pipes arranged consecutively side by side as shown. The air which is to be heated passes from a feed line 1 into a distributor box 2, from there through the pipes of pipe group I into a connecting box 3 from where it flows through the pipes of pipe group II to a collector box 4 and then to a discharge line 5. A bend K in the pipes is opposite to the direction of flow of the fuel gases and longitudinally of the pipes.

The distributor box 2 and collector box 4 are suspended in opening 10, 11 of roof 13 of the fuel gas channel Ch and are held in place there by flanges and rods 14. The space between the boxes 2 and 4 and the channel roof is sealed off by packing or sealing material. The pipes R are suspended by the boxes 1 and 4 and the box 3 is suspended freely in a recess 15 of the channel floor 16 and the walls of the recess again tightly enclose the box.

At the elevation of the first pipes $R_1$, $R_2$ and $R_3$, a stop member 6 is below the connecting box 3 in the recess 15. A distance $x$ which separates the stop from the underside of the connecting box is selected so that when the pipes are acted upon by the hot fuel gases, connecting box 3 will assume a generally horizontal position. In so doing, the forward section 3a of the box 3 will come to rest upon the stop 6 by its own weight, with the result that despite their thermally different load, the consecutively arranged pipes will nevertheless show a uniform bend or curvature. The rear portion of the pipes, i.e., that portion which is located at the elevation of group II and at the elevation of the rearward pipes of group I, will hang down freely.

It is possible to change the elevation of stop 6, whose support surface $6a$ is substantially perpendicular to the longitudinal axis of pipes $R_1$, $R_2$ and $R_3$ and this can readily be accomplished by placing thereunder suitable raising means such as discs or an adjustable screw 21 and the like. The stop may also be adjusted in the direction of arrow 0 by a second adjustable screw 22 as shown in FIGURE 2.[1] The stop 6 preferably extends along the entire width of the connecting box 3, but it may also be divided into two sections longitudinally.

In FIGURE 2 bend N of pipes R lies in the direction of flow of the fuel gases which is indicated by an arrow S. The lower connecting box is subdivided into two separate boxes 7 and 8 with a connecting conduit 9 therebetween. In this case, too, a stop 6 is disposed below the first connecting box 8 at the elevation of first pipes $R_1$, $R_2$, and $R_3$. The weight of the front section of the recuperator rests on this stop, so that here, too, the recuperator is divided into a hanging or partially supported and partially hanging section, or a completely supported section.

The recuperator may also have other groups of pipes. It is also possible in special cases where only one group of pipes is used, to provide a limit stop 6 in a similar manner, whereby the stop used brings about a horizontal positioning of the one or several connecting boxes, as well as the uniform expansion of the pipes.

It is particularly advantageous, and boosts the effect of stop 6, to have those pipes which are first in line with respect to the direction of flow of the fuel gases, provided with a lesser longitudinal bend or curvature than the rest of the pipes. In FIGURE 1, pipes $R_{10}$ and $R_{11}$ are shown in dotted lines as having a lesser bend than the pipes R behind them.

While I have shown and described preferred embodiments of my invention, it may be otherwise embodied within the scope of the appended claims.

I claim:

1. In recuperator apparatus having a fuel gas channel through which flows heated gases, the invention comprising a plurality of spaced apart pipes suspended in said channel substantially perpendicularly of a path of flow of said gases in said channel, said pipes being disposed along a portion of said path of flow of said gases for traverse of said gases therebetween and therethrough, the ends of said pipes opening into upper distributor and collector boxes and into at least one lower connecting box, said pipes being suspended from said distributor and collector boxes and said connecting box being suspended from said pipes so that said pipes are expansible, said pipes conveying therethrough air to be warmed and being bent substantially longitudinally in one of a direction with and opposite to said path of flow of said gases, a stop member located in said channel below that portion of said connecting box adjacent those pipes on the entry side of said flow of said gases therebetween and therethrough said pipes and at a position below said connecting box for limiting expansion of said those pipes by engagement with said connecting box upon a given amount of expansion of said those pipes, said stop member including a support surface for said connecting box, said support surface being disposed substantially perpendicular to the longitudinal axis of said suspended pipes.

2. The invention of claim 1 characterized by means in engagement with said stop member for moving same toward and away from said collecting box, in at least one of a direction transverse of the longitudinal axis of said suspended pipes and of a direction substantially parallel to the longitudinal axis of said suspended pipes.

3. The invention of claim 1 characterized by said stop member extending across at least a portion of the width of said collecting box.

4. The invention of claim 1 characterized by said those pipes having a smaller amount of longitudinal bend than other of said pipes contacted by said gases.

5. The invention of claim 2 wherein said those pipes have a smaller amount of longitudinal bend than the other of said pipes contacted by said gases.

References Cited by the Examiner

UNITED STATES PATENTS

| | | | |
|---|---|---|---|
| 2,610,832 | 9/1952 | Holmes et al. | 165—69 |
| 3,053,510 | 9/1962 | Olson et al. | 165—145 |
| 3,134,430 | 5/1964 | Heyn | 165—145 |
| 3,163,208 | 12/1964 | Cuzzone et al. | 165—69 |
| 3,180,407 | 4/1965 | Hanke | 165—145 |

ROBERT A. O'LEARY, *Primary Examiner.*

T. W. STREULE, *Assistant Examiner.*

---

[1] The screws 21 and 22 can be reached by small vertical channels 23, 23a in the floor 16 closed by a detachable closing flap 24, 24a.